US010063008B2

(12) United States Patent
Kawai et al.

(10) Patent No.: US 10,063,008 B2
(45) Date of Patent: Aug. 28, 2018

(54) CONNECTOR

(71) Applicant: YAZAKI CORPORATION, Tokyo (JP)

(72) Inventors: Ryuji Kawai, Kakegawa (JP); Tomokazu Iwami, Kakegawa (JP); Michitake Masuda, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/672,702

(22) Filed: Aug. 9, 2017

(65) Prior Publication Data

US 2018/0048090 A1 Feb. 15, 2018

(30) Foreign Application Priority Data

Aug. 10, 2016 (JP) .................................. 2016-158046

(51) Int. Cl.
*H01R 13/58* (2006.01)
*H01R 13/66* (2006.01)
*H01R 13/64* (2006.01)
*G05D 23/19* (2006.01)

(52) U.S. Cl.
CPC ..... *H01R 13/5829* (2013.01); *H01R 13/5812* (2013.01); *H01R 13/6683* (2013.01); *G05D 23/1928* (2013.01); *H01R 13/64* (2013.01)

(58) Field of Classification Search
CPC ............ H01R 13/6608; H01R 13/6616; H01R 13/6625; H01R 13/4223; H01R 13/113
USPC .............................. 439/620.21, 620.01, 752.5
See application file for complete search history.

(56) References Cited

U.S. PATENT DOCUMENTS

| 4,464,005 A * | 8/1984 | Dwight .................. H01R 12/75 439/485 |
| 5,425,661 A * | 6/1995 | Self, Jr. ................ H01R 13/432 439/748 |
| 6,165,027 A * | 12/2000 | Huang ................... H01R 13/41 439/733.1 |

(Continued)

FOREIGN PATENT DOCUMENTS

| JP | 5-135827 A | 6/1993 |
| JP | 2002-352635 A | 12/2002 |

(Continued)

OTHER PUBLICATIONS

Japanese Office Action issued in corresponding Japanese Patent Application No. 2016-158046 dated Jun. 26, 2018.

*Primary Examiner* — Gary Paumen
(74) *Attorney, Agent, or Firm* — Sughrue Mion, PLLC (57) ABSTRACT

A connector includes a terminal configured to be connected to an electric cable, a housing configured to contain the terminal, a terminal holder configured to be attached to the housing, and has a housing space portion configured to contain a connection part between the terminal and an end portion of the electric cable, a sensor housing portion provided in the terminal holder adjacently to the housing space portion, and a temperature sensor configured to be contain and held in the sensor housing portion. The temperature sensor has an end face which is located on a front side in a mounting direction of the terminal holder into the housing. The end face of the temperature sensor is exposed from the sensor housing portion and is brought into directly abutment against the terminal.

8 Claims, 7 Drawing Sheets

(56) References Cited

U.S. PATENT DOCUMENTS

| | | | |
|---|---|---|---|
| 7,666,033 B1 * | 2/2010 | Fung | H01R 13/7137 439/620.26 |
| 8,585,446 B2 * | 11/2013 | Manske | H01R 13/41 439/595 |
| 2009/0023342 A1 * | 1/2009 | Korich | B60L 11/1818 439/620.21 |
| 2011/0256767 A1 * | 10/2011 | Malstrom | H01R 13/6683 439/620.01 |
| 2011/0256768 A1 * | 10/2011 | Malstrom | H01R 13/665 439/620.01 |
| 2014/0073189 A1 * | 3/2014 | Kondou | H01R 13/7137 439/620.21 |
| 2015/0171567 A1 * | 6/2015 | Kawamoto | H01R 13/665 439/620.21 |
| 2016/0013597 A1 * | 1/2016 | Huang | H01R 13/6683 439/620.21 |
| 2016/0072224 A1 | 3/2016 | Ichio | |
| 2016/0111831 A1 * | 4/2016 | Kawai | H01R 13/04 439/620.21 |
| 2016/0126681 A1 | 5/2016 | Kawai et al. | |

FOREIGN PATENT DOCUMENTS

| | | |
|---|---|---|
| JP | 2013-219937 A | 10/2013 |
| JP | 2015-8099 A | 1/2015 |
| JP | 2015-11797 A | 1/2015 |
| WO | 2014/147760 A1 | 9/2014 |

* cited by examiner

CONNECTOR

CROSS REFERENCE TO RELATED APPLICATIONS

This application is based on Japanese Patent Application (No. 2016-158046) filed on Aug. 10, 2016, the contents of which are incorporated herein by reference.

BACKGROUND OF THE INVENTION

1. Field of the Invention

The present invention relates to a connector.

2. Description of the Related Art

When a feeding connector which serves as a counterpart connector is fitted into a charging connector assembled to a body of a vehicle, a battery mounted in the vehicle such as an electric vehicle or a plug-in hybrid electric vehicle is charged.

A connector has been known as such a charging connector. In the connector, an electric cable is placed on a thermistor so that the thermistor and the electric cable can be fixed tightly with each other. Temperature of the electric cable is measured by the thermistor to monitor presence/absence of an overcurrent or the like applied during charging (e.g. see JP-A-2015-8099). In addition, another connector has also been known as such a charging connector. In the other connector, temperature of a terminal is measured by a thermistor through an electrically insulating and thermally conductive material (e.g. see JP-A-2002-352635).

In the connector described in JP-A-2015-8099, the temperature of the electric cable can be measured accurately. However, in a separate position from a terminal, the thermistor is disposed along the electric cable. For this reason, it is difficult to measure temperature of the terminal accurately. In addition, in the connector described in JP-A-2002-352635, the temperature of the terminal is measured by the thermistor through the electrically insulating and thermally conductive material. For this reason, it is difficult to measure the temperature of the terminal rapidly when there is a sudden change in the temperature.

SUMMARY OF THE INVENTION

The invention has been accomplished in consideration of the aforementioned circumstances. An object of the invention is to provide a connector in which temperature of a terminal can be measured accurately even when there is a sudden change in the temperature.

In order to achieve the aforementioned object, the connector according to the invention is characterized by the following configurations (1) to (4).

(1) A connector including:
a terminal configured to be connected to an electric cable;
a housing configured to contain the terminal;
a terminal holder configured to be attached to the housing, and has a housing space portion configured to contain a connection part between the terminal and an end portion of the electric cable;
a sensor housing portion provided in the terminal holder adjacently to the housing space portion; and
a temperature sensor configured to be contain and held in the sensor housing portion, wherein the temperature sensor has an end face which is located on a front side in a mounting direction of the terminal holder into the housing; and wherein the end face of the temperature sensor is exposed from the sensor housing portion and is be brought into directly abutment against the terminal.

(2) The connector according to the aforementioned configuration (1), wherein a pressing rib configured to press the temperature sensor contained in the sensor housing portion toward the housing space portion is protrudingly provided on, of inner wall faces forming the sensor housing portion, at least an inner wall face opposite to the housing space portion except an inner wall adjacent to the housing space portion.

(3) The connector according to the aforementioned configuration (1) or (2), wherein an air layer is provided around the temperature sensor except the housing space portion side in the sensor housing portion.

(4) The connector according to any one of the aforementioned configurations (1) to (3), wherein a pressing piece configured to press the temperature sensor in the mounting direction is provided on a rear side of the sensor housing portion in the mounting direction.

(5) The connector according to any one of the aforementioned configurations (1) to (4), wherein the end face of the temperature sensor is protruded from an end portion of the sensor housing portion in the mounting direction.

In the connector having the aforementioned configuration (1), temperature of the terminal can be measured directly by the temperature sensor in which an end face thereof in the mounting direction of the terminal holder into the housing has been brought into abutment against the terminal. Thus, the temperature of the terminal can be measured while an influence caused by an external factor such as ambient temperature is minimized. Consequently, the temperature of the terminal can be measured accurately with excellent responsivity even to a sudden change in the temperature of the terminal.

In the connector having the aforementioned configuration (2), the temperature sensor contained in the sensor housing portion is pressed by the pressing rib against the inner wall face on the side of the housing space portion housing an end portion of the terminal to which the electric cable is connected. Thus, the temperature sensor contained in the sensor housing portion can be disposed as closely to the terminal side as possible. Consequently, the temperature of the terminal can be measured more accurately.

In the connector having the aforementioned configuration (3), due to a thermal insulation effect generated by the air layer, heat transmitted from the terminal to the temperature sensor can be suppressed to the utmost from being released to the outside. Thus, the temperature of the terminal can be measured more accurately.

In the connector having the aforementioned configuration (4), the temperature sensor is pressed in the mounting direction by elastic repulsion force of the pressing piece. Accordingly, the end face of the temperature sensor on the front side in the mounting direction is pushed against the terminal. Thus, tight contact between the temperature sensor and the terminal can be enhanced so that the temperature of the terminal can be measured more accurately.

According to the invention, it is possible to provide a connector in which temperature of a terminal can be measured accurately even when there is a sudden change in the temperature.

The invention has been described above briefly. When an undermentioned mode (hereinafter referred to as "embodi-

DETAILED DESCRIPTION OF THE EXEMPLARY EMBODIMENTS

An embodiment of the invention will be described below by way of example with reference to the drawings.

Figure 1:
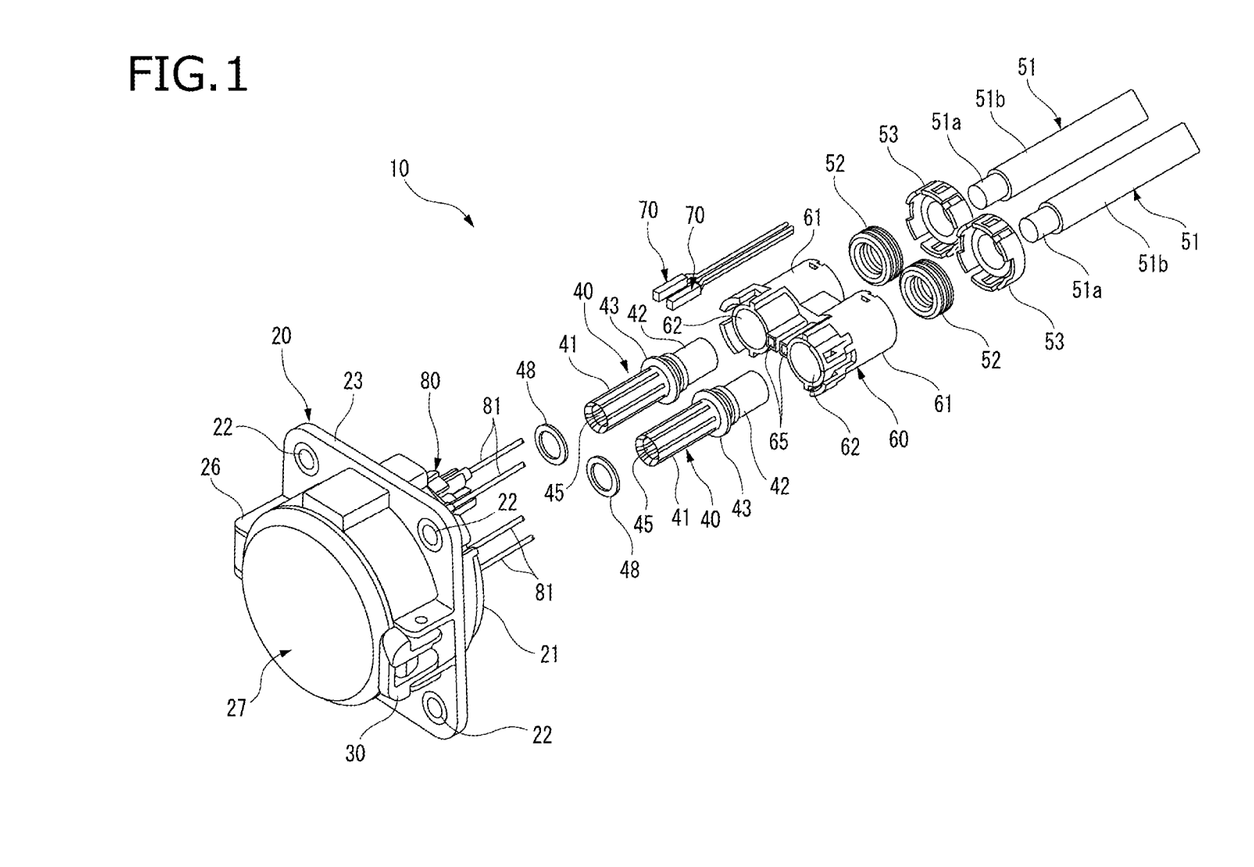
FIG. 1 is an exploded perspective view of a connector according to an embodiment of the invention.
Figure 2:
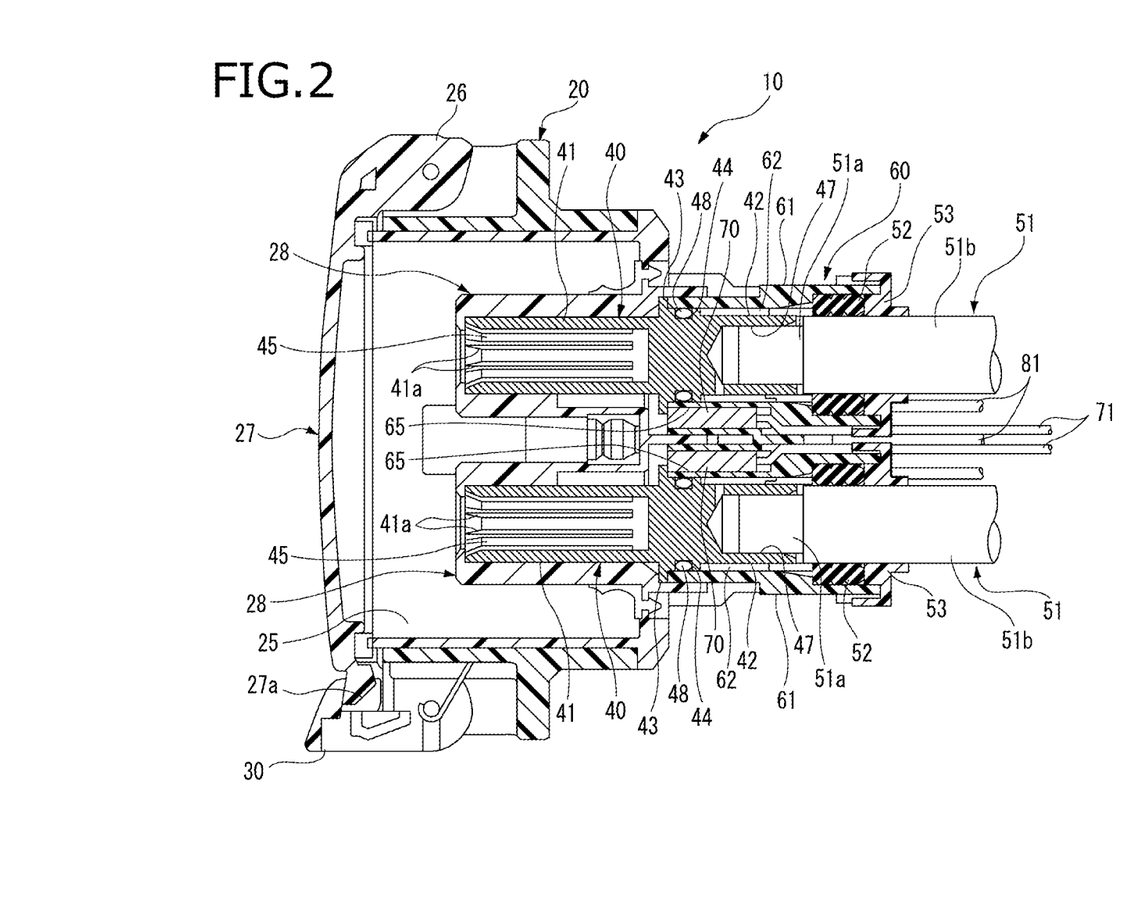
FIG. 2 is a horizontal sectional view of the connector according to the embodiment.

FIG. 1 is an exploded perspective view of a connector 10 according to the embodiment. FIG. 2 is a horizontal sectional view of the connector 10 according to the embodiment.

As shown in FIG. 1 and FIG. 2, the connector 10 according to the embodiment of the invention is provided with a housing 20, charging terminals (terminals) 40, a terminal holder 60, temperature sensors 70 and rear holders 80.

The connector 10 is a charging inlet connector assembled to a vehicle body of a vehicle mounted with a battery, such as an electric vehicle (EV) or a plug-in hybrid electric vehicle (PHEV). When the battery of the vehicle is charged, a feeding connector on a feeding device (not shown) side is fitted into the connector 10. In the state in which the feeding connector is fitted in the connector 10, electric power is fed from the feeding device toward the vehicle side so that the battery can be charged.

The housing 20 is formed out of an insulating synthetic resin. The housing 20 formed thus is shaped like a bottomed cylinder which has a bottom plate portion 21 on its rear end side. A fixation flange 23 having insertion holes 22 is formed on an outer circumference of the bottomed cylinder. The housing 20 is fitted from the bottom plate portion 21 side into an attachment hole which is formed in a vehicle body panel constituting the body of the vehicle. Bolts are inserted through the insertion holes 22 of the fixation flange 23 to be screwed into threaded holes of the vehicle body panel. Thus, the housing 20 is fastened and fixed to the vehicle body panel.

The housing 20 has a fitting recess 25 open on its front end side. A housing of the feeding connector is fitted into the fitting recess 25. The housing 20 has a cap 27 which is coupled to a portion of an edge portion of the fitting recess 25 by a hinge portion 26. The cap 27 is swung on the hinge portion 26. Thus, the fitting recess 25 is open/closed by the cap 27.

A lock mechanism 30 for locking a lock pawl 27a formed at an edge portion of the cap 27 is provided in an opposite position to the hinge portion 26 in an edge portion of the front end of the housing 20. Therefore, in the cap 27, the lock pawl 27a can be locked by the lock mechanism 30. Thus, when the lock pawl 27a of the cap 27 is locked by the lock mechanism 30, the housing 20 is maintained at a closed state by the cap 27.

A pair of terminal housing cylinder portions 28 protruding inside the fitting recess 25 are formed in the bottom plate portion 21 of the housing 20. In addition, a pair of terminal housing portions (not shown) are formed in upper and lower positions between the terminal housing cylinder portions 28 in the bottom plate portion 21 of the housing 20.

Each of the charging terminals 40 is a charging terminal through which a charging current is made to flow. For example, the charging terminals 40 are formed out of a conductively electric metal material such as copper or a copper alloy etc. The charging terminals 40 are fitted into the terminal housing cylinder portions 28 from the rear side of the housing 20 to be contained in parallel in the housing 20 in a horizontal plane.

Each of the charging terminals 40 has a front end-side terminal connecting portion 41, a rear end-side cable connecting portion 42, and a flange portion 43. The flange portion 43 juts out of an outer circumference of the charging terminal 40 so as to extend circumferentially between the terminal connecting portion 41 and the cable connecting portion 42.

Each of the terminal connecting portions 41 of the charging terminals 40 is formed into a cylinder having a fitting hole 45. A plurality of slits 41a each extending in an axis direction are formed in the terminal connecting portion 41 so that the terminal connecting portion 41 is divided into a plurality of parts circumferentially. Charging terminals of the feeding connector which is a counterpart connector are fitted into the fitting holes 45 of the terminal connecting portions 41. Thus, the charging terminals 40 are electrically connected to the charging terminals of the feeding connector fitted in the fitting holes 45.

Each of the cable connecting portions 42 of the charging terminals 40 has a connection hole 47. In addition, in the cable connecting portion 42 of the charging terminal 40, a groove portion 44 extending circumferentially is formed in a position adjacent to the flange portion 43. An O-ring 48 is mounted on the groove portion 44.

In the charging terminals 40, power cables 51 are connected to the cable connecting portions 42. The power cables 51 are electric cables which are connected to the battery of the vehicle and through which a large current is made to flow. Each of the power cables 51 has a conductor 51a exposed from a coating 51b at an end portion of the power cable 51. The conductors 51a exposed at the end portions of the power cables 51 are inserted into the connection holes 47 formed in the cable connecting portions 42 of the charging terminals 40, so that the conductors 51a can be caulked to the connection holes 47. Consequently, the power cables 51 are electrically connected to the charging terminals 40. Incidentally, the structure for connecting the power cables 51 to the charging terminals 40 is not limited to the caulking fixation. It is a matter of course that various publicly known connection structures can be used alternatively.

The terminal holder 60 is formed out of an insulating synthetic resin. The terminal holder 60 has a pair of holder portions 61 which are formed into cylinders covering connection places between the charging terminals 40 and the power cables 51 respectively. The connection places between the charging terminals 40 and the end portions of the power cables 51 are contained in housing space portions 62 formed in the holder portions 61. The power cables 51 are led rearward from the housing space portions 62 of the holder portions 61. On this occasion, open front ends of the terminal holder 60 abut against the flange portions 43 of the charging terminals 40. Thus, the charging terminals 40 in which the cable connecting portions 42 are inserted in the housing space portions 62 are positioned.

A rubber stopper 52 and a rubber stopper holding fixture 53 are mounted in advance on each of the power cables 51 led out of the housing space portions 62 of the holder portions 61. The rubber stoppers 52 are fitted into the housing spacing portions 62 of the holder portions 61, and further, the rubber stopper holding fixtures 53 are fixed to end portions of the holder portions 61. Thus, the holder portions 61 from which the power cables 51 are led are made waterproof by the rubber stoppers 52. Incidentally, when waterproofness in the terminal holder 60 is unnecessary, the rubber stoppers 52 fitted in the housing space portions 62 of the holder portions 61 can be removed.

Figure 3A:
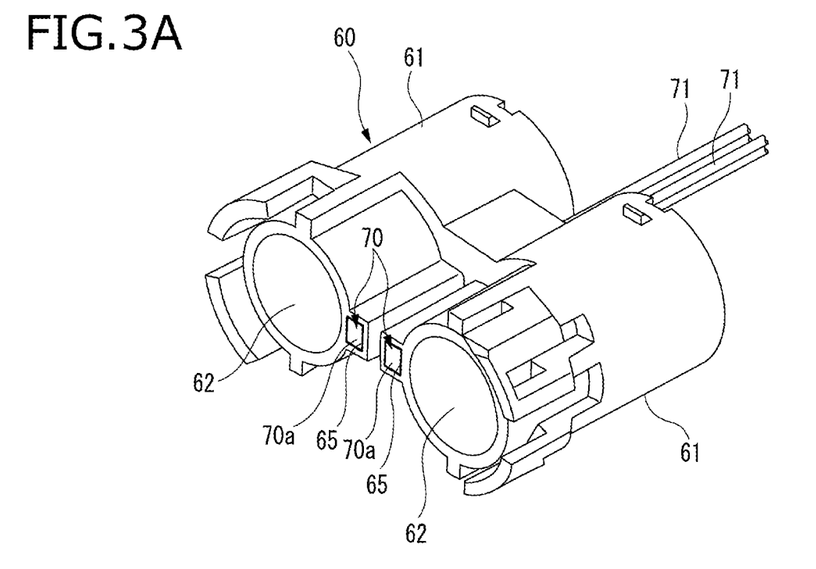
FIGS. 3A and 3B are views showing a terminal holder in which temperature sensors are contained, FIG. 3A being a perspective view of the terminal holder, FIG. 3B being a front view of the terminal holder.
Figure 3B:
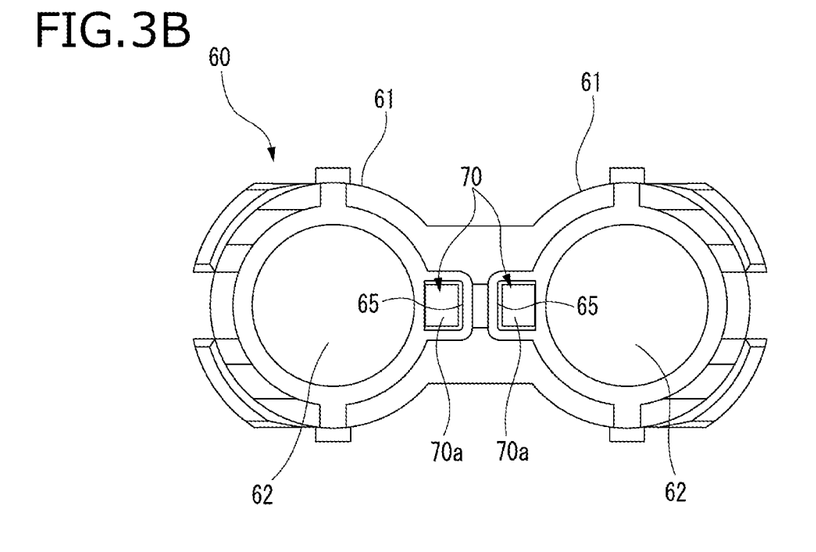
Figure 4:
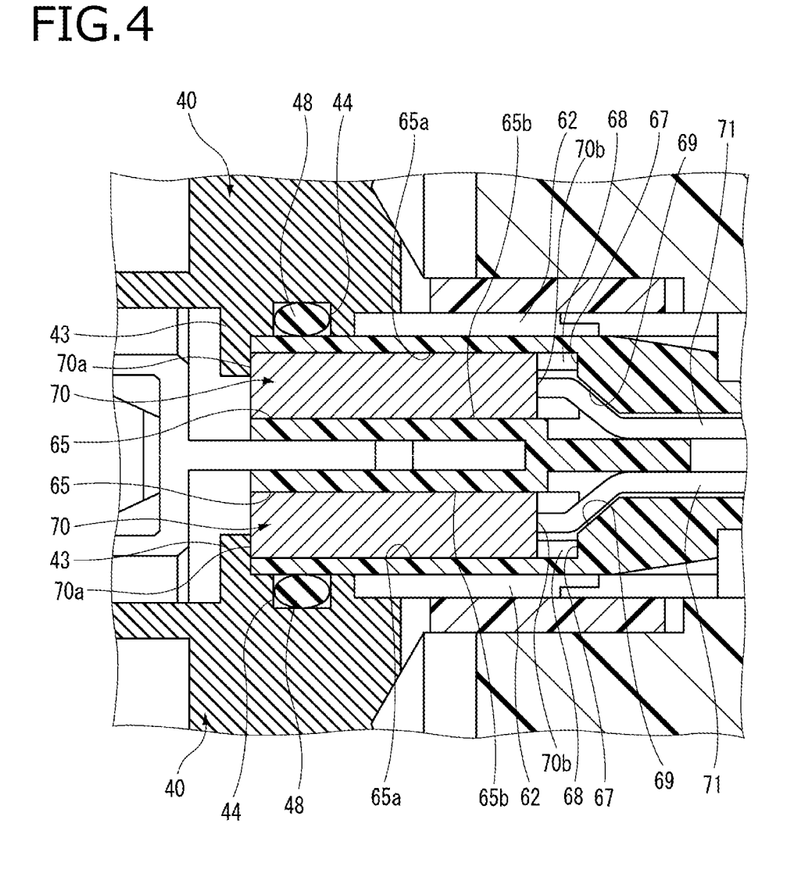
FIG. 4 is an enlarged horizontal sectional view of the connector in a place where the temperature sensors are disposed.

FIGS. 3A and 3B are views showing the terminal holder 60 in which temperature sensors 70 are contained. FIG. 3A is a perspective view of the terminal holder 60. FIG. 3B is a front view of the terminal holder 60. FIG. 4 is an enlarged horizontal sectional view of a portion of the connector 10 where the temperature sensors 70 are disposed.

As shown in FIGS. 3A and 3B and FIG. 4, the terminal holder 60 has sensor housing portions 65 in the holder portions 61 respectively. The temperature sensors 70 are contained in the sensor housing portions 65 respectively. The sensor housing portions 65 are disposed between the holder portions 61. In a state in which the terminal holder 60 is mounted in the housing 20, the sensor housing portions 65 are disposed in positions facing the flange portions 43 of the charging terminals 40.

Figure 5:
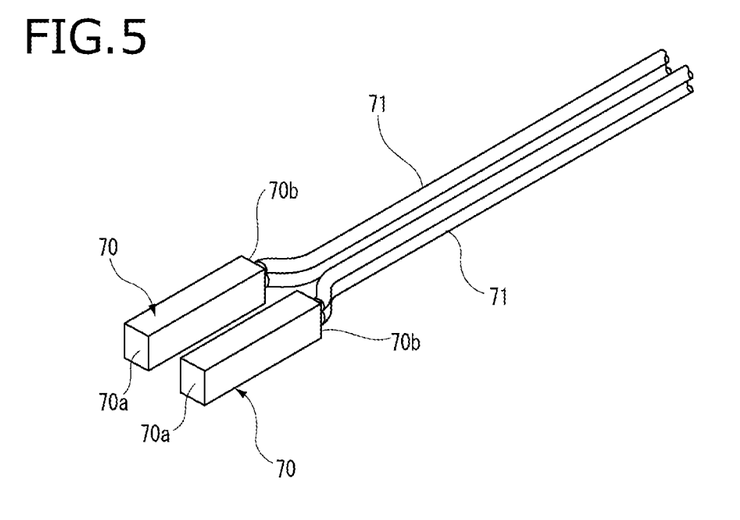
FIG. 5 is a perspective view of the temperature sensors.

FIG. 5 is a perspective view of the temperature sensors 70.

As shown in FIG. 5, each of the temperature sensors 70 contained in the sensor housing portions 65 is, for example, a thermistor having a thermistor element for detecting temperature. The temperature sensor 70 is shaped like a cuboid in which the thermistor element is coated with a resin. A detection line 71 connected to the thermistor element is led out of a rear end of the temperature sensor 70.

Figure 6A:
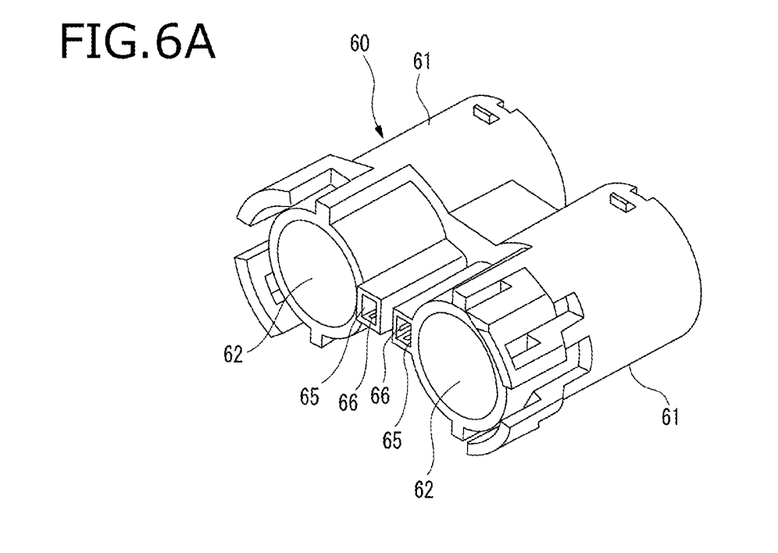
FIGS. 6A and 6B are views showing the terminal holder in which the temperature sensors have not been contained yet, FIG. 6A being a perspective view of the terminal holder, FIG. 6B being a front view of the terminal holder.
Figure 6B:
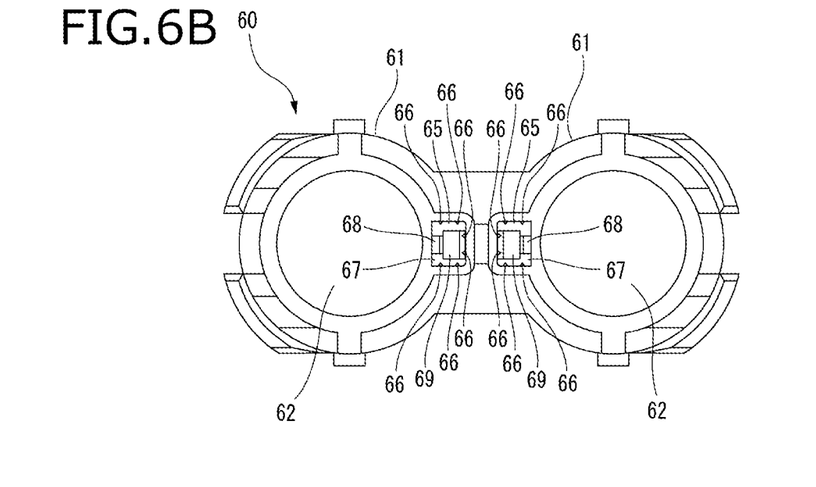
Figure 7:
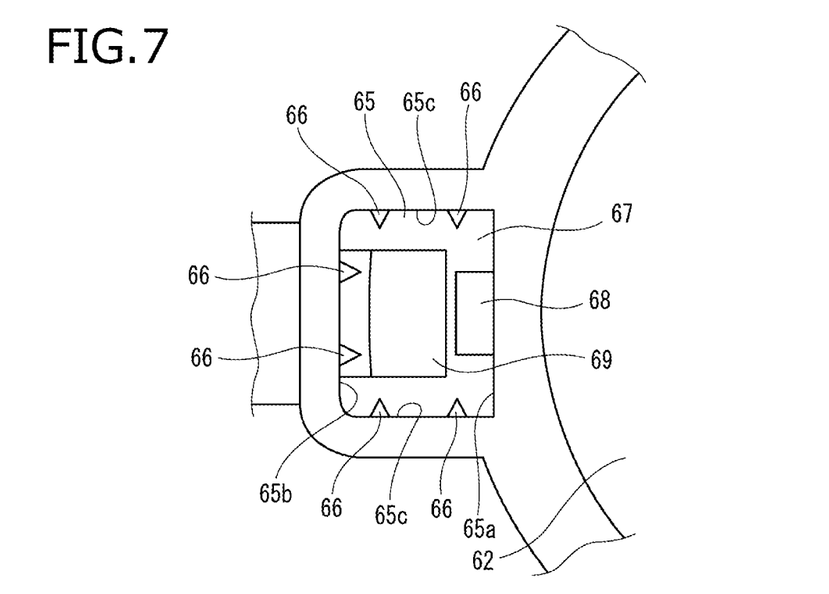
FIG. 7 is a front view of a sensor housing portion of the terminal holder in which the temperature sensor has not been contained yet.

FIGS. 6A and 6B are views showing the terminal holder 60 in which the temperature sensors 70 have not been contained yet. FIG. 6A is a perspective view of the terminal holder 60. FIG. 6B is a front view of the terminal holder 60. FIG. 7 is a front view of one of the sensor housing portions 65 of the terminal holder 60 in which the temperature sensors 70 have not been contained yet.

As shown in FIGS. 6A and 6B and FIG. 7, each of the sensor housing portions 65 includes a hole portion which is shaped like a rectangle in section and open on the front side. The sensor housing portion 65 is formed adjacently to the housing space portion 62. An end portion of the charging terminal 40 to which the power cable 51 is connected is contained in the housing space portion 62. The sensor housing portion 65 has an inner wall face 65a on the housing space portion 62 side of the holder portion 61, an inner wall face 65b facing the inner wall face 65a, and two inner wall faces 65c on opposite end sides of the inner wall faces 65a and 65b. In the sensor housing portion 65, a plurality of pressing ribs 66 each extending in the axis direction are provided protrudingly on all the inner wall faces 65b and 65c except the inner wall face 65a which is located on the housing space portion 62 side of the holder portion 61. A space portion surrounded by the inner wall face 65a and the pressing ribs 66 in the sensor housing portion 65 is made slightly smaller than the size of the sectional shape of the temperature sensor 70.

In addition, a rear end side of the sensor housing portion 65 is closed by a rear wall 67. A pressing piece 68 protruding frontward is formed on the rear wall 67. In addition, an electric cable inserting hole 69 communicating with the outside is formed in the rear wall 67.

The temperature sensor 70 is contained in the sensor housing portion 65 in the following manner. That is, first, the detection line 71 led out of the temperature sensor 70 is inserted from the open front side of the sensor housing portion 65. The detection line 71 is inserted into the electric cable inserting hole 69 of the rear wall 67 and led out of the rear side. At the same time, the temperature sensor 70 is inserted from its rear end side into the sensor housing portion 65 so as to be contained in the sensor housing portion 65.

Figure 8:
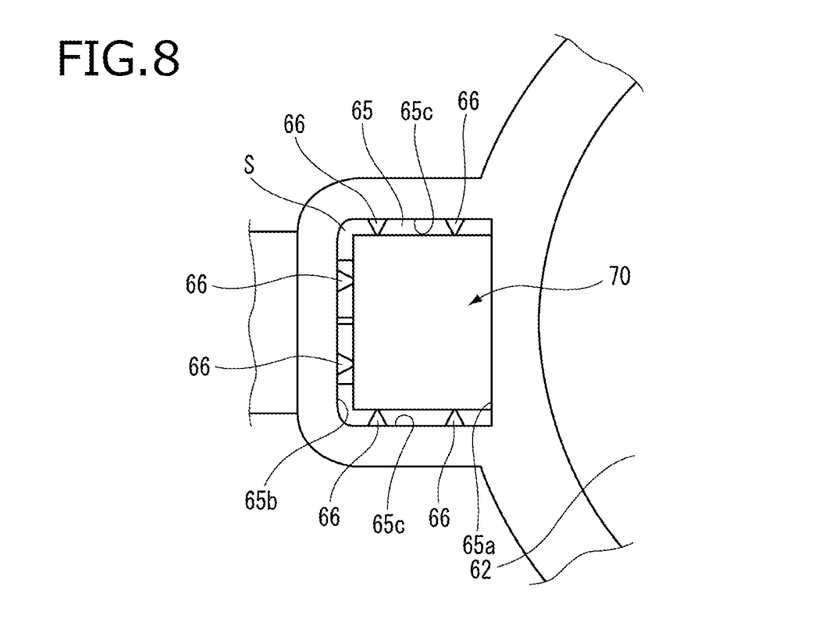
FIG. 8 is a front view of the sensor housing portion of the terminal holder in which the temperature sensor has been contained.

FIG. 8 is a front view of the sensor housing portion 65 of the terminal holder 60 in which the temperature sensor 70 has been contained.

As shown in FIG. 8, when the temperature sensor 70 is contained in the sensor housing portion 65, the pressing ribs 66 pressed by an outer circumferential face of the temperature sensor 70 are elastically deformed. Accordingly, by elastic force of the pressing ribs 66 on the inner wall face 65b, the temperature sensor 70 is pressed against the inner wall face 65a on the side of the housing space portion 62 housing the charging terminal 40. At the same time, the temperature sensor 70 is held from the opposite sides by the pressing ribs 66 on the inner wall faces 65c. Thus, the temperature sensor 70 is firmly held by the pressing ribs 66 inside the sensor housing portion 65. In addition, when the temperature sensor 70 is contained in the sensor housing portion 65, an air layer S is formed between all the inner wall faces 65b and 65c except the inner wall face 65a and the temperature sensor 70 by the pressing ribs 66. In addition, a rear end face 70b of the temperature sensor 70 abuts against the pressing piece 68 formed on the rear wall 67. In this state, a front end face (end face) 70a of the temperature sensor 70 protrudes slightly from the sensor housing portion 65.

Thus, the terminal holder 60 in which the temperature sensors 70 are contained in the sensor housing portions 65 are mounted into the housing 20 from the rear side. When the terminal holder 60 is mounted in the housing 20, the temperature sensors 70 protruding slightly from the sensor housing portions 65 abut against the flange portions 43 of the charging terminals 40 at their front end faces 70a to be pushed into the sensor housing portion 65 while electrically deforming the pressing pieces 68. Thus, the front end faces 70a of the temperature sensors 70 are pushed against the flange portions 43 of the charging terminals 40 by elastic force of the elastically deformed pressing pieces 68 (see FIG. 4).

Incidentally, according to another configuration, the temperature sensors 70 may be contained and positioned without elastically deforming the pressing pieces 68 so that the front end faces 70a of the temperature sensors 70 can be made to be flush with front end faces of the sensor housing portions 65.

The rear holders 80 are mounted in advance on signal lines 81. The signal lines 81 are electric cables which are connected to signal lines of the counterpart connector so as to transmit/receive signals and exchange communication between the feeding device and the vehicle. Signal terminals (not shown) are crimp-connected to end portions of the signal lines 81. The signal terminals of the signal lines 81 are inserted into the terminal housing portions of the housing 20. The rear holders 80 are put and mounted on the terminal housing portions in which the signal terminals have been inserted. Thus, the signal terminals are held in the terminal housing portions of the housing 20, and the signal lines 81 are led rearward from the housing 20. Signal terminals crimp-connected to end portions of the signal lines of the feeding connector which serves as the counterpart connector are connected to the signal terminals held in the terminal housing portions of the housing 20. Thus, the signal lines 81 of the connector 10 and the signal lines of the counterpart connector are electrically conductively to each other respectively so that the transmission/reception of signals or the exchange of communication can be performed.

When the feeding connector is fitted into the connector 10 configured thus to thereby charge the battery of the vehicle, temperatures of the charging terminals 40 can be detected by the temperature sensors 70. By the feeding device etc., a charging status can be monitored based on the temperatures of the charging terminals 40 measured by the temperature sensors 70.

According to the connector 10 according to the embodiment as described above, the temperatures of the charging terminals 40 can be measured directly by the temperature sensors 70 in which the front end faces 70a thereof in a mounting direction of the terminal holder 60 into the housing 20 have been brought into abutment against the flange portions 43 of the charging terminals 40. Thus, it is possible to measure the temperatures of the charging terminals 40 while minimizing the influence caused by an external factor such as ambient temperature etc. Consequently, it is possible to measure the temperatures of the charging terminals 40 accurately with excellent responsivity even to a sudden change in the temperatures of the charging terminals 40.

Accordingly, when the feeding connector is fitted into the connector 10 to thereby charge the battery of the vehicle, the charging status can be monitored accurately based on the temperatures of the charging terminals 40 measured by the temperature sensors 70.

In addition, in the connector 10 according to the embodiment, the temperature sensors 70 contained in the sensor housing portions 65 are pressed by the pressing ribs 66 against the inner wall faces 65a on the sides of the housing space portions 62 housing the end portions of the charging terminals 40 to which the power cables 51 are connected. Thus, the temperature sensors 70 contained in the sensor housing portions 65 can be disposed as closely to the sides of the charging terminals 40 as possible. Consequently, the temperatures of the charging terminals 40 can be measured more accurately.

Further, in the connector 10 according to the embodiment, due to a thermal insulation effect generated by the air layers S formed around the temperature sensors 70 except the sides of the housing space portions 62, heat transmitted from the charging terminals 40 to the temperature sensors 70 can be suppressed to the utmost from being released to the outside. Thus, the temperatures of the charging terminals 40 can be measured more accurately.

In addition, in the connector 10 according to the embodiment, the temperature sensors 70 are pressed in the mounting direction by elastic repulsion forces of the pressing pieces 68 formed on the rear walls 67 on the rear side in the mounting direction in the sensor housing portions 65. Accordingly, the front end faces 70a on the front side in the mounting direction are pushed against the flange portions 43 of the charging terminals 40. Thus, tight contact between the temperature sensors 70 and the charging terminals 40 can be enhanced so that the temperatures of the charging terminals 40 can be measured more accurately.

Further, the case where the connector 10 is used as a charging inlet connector assembled to a vehicle body of a vehicle mounted with a battery has been described in the aforementioned embodiment. However, the connector according to the invention is not limited thereto but may be used as a feeding outlet connector for feeding electric power to a device outside a vehicle from a battery of the vehicle.

Incidentally, the invention is not limited to the aforementioned embodiment. Modifications, improvements, etc. can be made suitably on the invention. Moreover, materials, shapes, dimensions, numbers, arrangement places, etc. of respective constituent elements in the aforementioned embodiment are not limited. Any materials, any shapes, any dimensions, any numbers, any arrangement places, etc. may be used as long as the invention can be attained.

Here, the aforementioned features of the connector according to the embodiment of the invention will be summarized and listed briefly in the following items [1] to [4] respectively.

[1] A connector (10) including:
a terminal (charging terminals 40) configured to be connected to an electric cable (power cables 51);
a housing (20) configured to contain the terminal;
a terminal holder (60) configured to be attached to the housing, and has a housing space portion (62) configured to contain a connection part between the terminal and an end portion of the electric cable;
a sensor housing portion (65) provided in the terminal holder adjacently to the housing space portion; and
a temperature sensor (70) configured to be contain and held in the sensor housing portions,
wherein the temperature sensor has an end face (front end face 70a) which is located on a front side in a mounting direction of the terminal holder into the housing, and the end face of the temperature sensor is exposed from the sensor housing portion and is brought into directly abutment against the terminal.

[2] The connector (10) according to the aforementioned item [1], wherein a pressing rib (66) configured to press the temperature sensor (70) contained in the sensor housing portion toward the housing space portion is protrudingly provided on, of inner wall faces (65a, 65b, 65c) forming the sensor housing portions (65), at least an inner wall face (65b) opposite to the housing space portion except an inner wall adjacent to the housing space portion (62).

[3] The connector according to the aforementioned item [1] or [2], wherein an air layer (S) is provided around the temperature sensor (70) except the housing space portion (62) side in the sensor housing portion (65).

[4] The connector according to any one of the aforementioned items [1] to [3], wherein a pressing piece (68) configured to press the temperature sensor (70) in the mounting direction is provided on a rear side of the sensor housing portion (65) in the mounting direction.

[5] The connector according to any one of the aforementioned items [1] to [4], wherein the end face of the temperature sensor is protruded from an end portion of the sensor housing portion in the mounting direction.

What is claimed is:

1. A connector comprising:
a terminal configured to be connected to an electric cable;
a housing that contains the terminal;
a terminal holder attached to the housing, that comprises a housing space portion that holds the terminal and is configured to contain a connection interface between the terminal and an end portion of the electric cable;
wherein the terminal holder further comprises a sensor housing portion adjacent to the housing space portion; and
a temperature sensor contained and held in the sensor housing portion,
wherein the temperature sensor has an end face which is located on a front side in a mounting direction of the terminal holder into the housing; and
wherein the end face of the temperature sensor is exposed from the sensor housing portion and is brought into direct abutment against the terminal.

2. The connector according to claim 1, wherein a pressing rib configured to press the temperature sensor contained in the sensor housing portion toward the housing space portion is protrudingly provided on an inner wall face forming the sensor housing portion other than an inner wall face adjacent to the housing space portion.

3. The connector according to claim 1, wherein an air layer is provided around the temperature sensor except a housing space portion side in the sensor housing portion.

4. The connector according to claim 1, wherein a pressing piece configured to press the temperature sensor in the mounting direction is provided on a rear side of the sensor housing portion in the mounting direction.

5. The connector according to claim 1, wherein the end face of the temperature sensor protrudes from an end portion of the sensor housing portion in the mounting direction.

6. The connector according to claim 1, wherein the terminal comprises an annular flange, and the end face of the temperature sensor is brought into direct abutment against the annular flange.

7. The connector according to claim 1, wherein the terminal holder comprises two housing space portions, and the sensor housing portion is interposed between the two housing space portions.

8. The connector according to claim 7, further comprising a second sensor housing portion, also interposed between the two housing space portions, and
a second temperature sensor contained and held in the second sensor housing portion.

* * * * *